United States Patent
Yoneda

(10) Patent No.: US 12,293,889 B2
(45) Date of Patent: May 6, 2025

(54) PROTECTIVE CIRCUIT

(71) Applicant: DEXERIALS CORPORATION, Tochigi (JP)

(72) Inventor: Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 195 days.

(21) Appl. No.: 17/927,339

(22) PCT Filed: May 27, 2021

(86) PCT No.: PCT/JP2021/020192
§ 371 (c)(1),
(2) Date: Nov. 22, 2022

(87) PCT Pub. No.: WO2021/241684
PCT Pub. Date: Dec. 2, 2021

(65) Prior Publication Data
US 2023/0207241 A1 Jun. 29, 2023

(30) Foreign Application Priority Data
May 29, 2020 (JP) .................................. 2020-094274

(51) Int. Cl.
*H01H 37/76* (2006.01)
*H01H 85/11* (2006.01)
(Continued)

(52) U.S. Cl.
CPC ............ *H01H 37/76* (2013.01); *H01H 85/11* (2013.01); *H01M 10/48* (2013.01); *H02H 3/20* (2013.01);
(Continued)

(58) Field of Classification Search
CPC ....... H01H 37/76; H01H 85/11; H01M 10/48; H01M 10/44; H02H 3/20; H02H 7/18; H02J 7/0013; H02J 7/00308
See application file for complete search history.

(56) References Cited

U.S. PATENT DOCUMENTS

2007/0188148 A1   8/2007  Kawasumi et al.
2012/0112871 A1*  5/2012  Chen ................... H01H 85/044
                                                    337/297
(Continued)

FOREIGN PATENT DOCUMENTS

JP        2000133318     5/2000
JP        2005151696     6/2005
(Continued)

OTHER PUBLICATIONS

Sato JP4244452B2 translation.*
(Continued)

*Primary Examiner* — Jacob R Crum
(74) *Attorney, Agent, or Firm* — Schwegman Lundberg & Woessner. P.A.

(57) ABSTRACT

A protective circuit (1A) includes a protective element (10A), a plurality of secondary battery cells (20), (20), . . . , an external positive electrode terminal (30*a*) and an external negative electrode terminal (30*b*), an auxiliary power supply (40), a first control device (50), and a switch (60). The protective element (10A) has a first fusible conductor (15) of which both ends are connected to a first terminal (11) and a second terminal (12), and a heat generator (16) installed on a first energizing path ($P1_A$) between a third terminal (13) and a fourth terminal (14). The auxiliary power supply (40) is provided electrically independently of the plurality of secondary battery cells (20), (20), . . . . In this protective circuit (1A), the switch (60) is switched to energization by a signal from the first control device (50), the (Continued)

heat generator (16) of the protective element (10A) generates heat, and the first fusible conductor (15) is fused to cut off a portion between the plurality of secondary battery cells (20), (20), . . . and the external negative electrode terminal (30b).

12 Claims, 12 Drawing Sheets

(51) Int. Cl.
    *H01M 10/48*     (2006.01)
    *H02H 3/20*     (2006.01)
    *H02H 7/18*     (2006.01)
    *H01M 10/44*     (2006.01)
    *H02J 7/00*     (2006.01)

(52) U.S. Cl.
    CPC .............. *H02H 7/18* (2013.01); *H01M 10/44* (2013.01); *H02J 7/0013* (2013.01); *H02J 7/00308* (2020.01)

(56) References Cited

U.S. PATENT DOCUMENTS

| | | | |
|---|---|---|---|
| 2013/0323548 | A1 | 12/2013 | Iwamoto |
| 2015/0084734 | A1* | 3/2015 | Yoneda .................. H01H 85/06 337/183 |
| 2016/0094059 | A1 | 3/2016 | Maetani |
| 2017/0236666 | A1* | 8/2017 | Furuuchi ................ H01H 37/34 327/525 |
| 2019/0157031 | A1* | 5/2019 | Su .......................... H01H 83/20 |
| 2019/0379089 | A1 | 12/2019 | Kim et al. |

FOREIGN PATENT DOCUMENTS

| | | |
|---|---|---|
| JP | 2007-123129 | 5/2007 |
| JP | 4244452 | 3/2009 |
| JP | 2012010525 | 1/2012 |
| JP | 2015-46316 | 3/2015 |
| JP | 2016035816 | 3/2016 |
| JP | 2016-67165 | 4/2016 |
| KR | 20140140100 | 12/2014 |
| TW | 201524064 | 6/2015 |
| WO | 2015033563 | 3/2015 |

OTHER PUBLICATIONS

"International Application No. PCT/JP2021/020192, International Search Report mailed Jul. 27, 2021", 4 pgs.
"Japanese Application Serial No. 2021-090220, Office Action dated Feb. 27, 2024", w English Translation, (Feb. 27, 2024), 11 pgs.
"Japanese Application Serial No. 2021-090220, Office Action dated Jun. 6, 2023", w English Translation, (Jun. 6, 2023), 21 pgs.
"Korean Application No. 10-2022-7035083, Office Action dated Jun. 10, 2024", w English Translation, (Jun. 10, 2024), 15 pgs.
"Taiwanese Application No. 110119483, Office Action dated Oct. 11, 2024", w English Translation, (Oct. 11, 2024), 5 pgs.
"Indian Application No. 202217072887, Office Action dated Mar. 4, 2025", w English Translation, (Mar. 4, 2025), 5 pgs.

* cited by examiner

PROTECTIVE CIRCUIT

PRIORITY APPLICATIONS

This application is a U.S. National Stage Filing under 35 U.S.C. § 371 from International Application No. PCT/JP2021/020192, filed on May 27, 2021, and published as WO2021/241684 on Dec. 2, 2021, which claims the benefit of priority to Japanese Patent Application No. 2020-094274 filed on May 29, 2020; the benefit of priority of each of which is hereby claimed herein, and which applications and publication are hereby incorporated herein by reference in their entireties.

TECHNICAL FIELD

The present invention relates to a protective circuit, and for example, to a protective circuit provided in a charging and discharging circuit of a secondary battery.

BACKGROUND ART

Lithium ion batteries are widely used as power supplies for mobile devices such as notebook computers. A surface-mounted fuse with a heater (a self control protector, hereinafter also referred to as an SCP) is installed in a protective circuit of a secondary battery such as a lithium ion battery. In the event of an overvoltage abnormality, electric power is supplied to the heater from the secondary battery itself to generate heat, and a fuse element is fused.

For example, as a protective circuit of the related art, as shown in FIGS. 13(a) and 13(b), there is a protective circuit 100 including an SCP 110 that has fuse elements 111 and 111 connected to each other on an energizing path and a heater 112 which is connected to the fuse elements 111 and 111 and can fuse the fuse elements 111 and 111 by heating, an IC 130 that detects an abnormality in battery cells 121, 121, . . . of a battery 120 which are connected to the energizing path, an FET 140 that operates to energize the heater 112 of the SCP 110 on the basis of the detection result of the IC 130, an IC 150 that detects an abnormality in the entire battery 120, and FETs 160 and 160 that operates to energize the heater 112 of the SCP 110 on the basis of the detection result of the IC 150. In this protective circuit 100, in a case where an abnormality is detected in each battery cell, the FET 140 is turned on, electric power is supplied from the battery 120 to the heater 112 of the SCP 110 to generate heat, and the fuse element 111 is fused.

In addition, as another protective circuit of the related art, a protective circuit in which a fusible conductor (a fuse element) is disposed between a data server and an Internet line and which includes a heat generator provided independently of the fusible conductor and a dedicated external power supply for a heat generator has been proposed (Patent Literature 1).

CITATION LIST

Patent Literature

[Patent Literature 1]
  Japanese Unexamined Patent Application, First Publication No. 2015-46316

SUMMARY OF INVENTION

Technical Problem

However, in a case where the protective circuit of the related art such as that shown in FIG. 13(a) is installed in a charging and discharging circuit of a large-capacity secondary battery for a motive power application, there is a problem that the heater is destroyed by a very high voltage and a very large current. In recent years, lithium ion batteries have been developed as secondary batteries from applications for mobile devices to applications for EVs, storage batteries, and the like, and their capacities have been increasing. In addition, as a capacity of a lithium ion battery has increased, a voltage has reached a high voltage specification of several hundred volts, and a current has reached a large current specification of several hundred amperes. Therefore, there is a demand for a highly safe protective circuit that can meet these needs.

In the protective circuit of Patent Literature 1, regardless of the type of external circuit such as a data server, electric power can be supplied to the heat generator to obtain a sufficient amount of heat for fusing the fusible conductor, and the protective circuit can be applied to a digital signal circuit, which causes a weak current to flow, as an external circuit. That is, Patent Literature 1 merely discloses a configuration in which a protective circuit is applied to a signal circuit to prevent information from leaking due to hacking or the like, and there is no disclosure or suggestion of applying the protective circuit to a charging and discharging circuit of a secondary battery for a motive power application. In addition, if a circuit voltage is in accordance with a low voltage specification of several tens of volts, it is conceivable to apply the above protective circuit. However, in a case where the circuit voltage is in accordance with a high voltage specification of several hundred volts and a large current specification of several hundred amperes, it is difficult to ensure voltage resistance of the heat generator and insulation properties after cut-off of the fusible conductor, and thus it is difficult to apply the above protective circuit to the charging and discharging circuit of a large-capacity secondary battery.

An object of the present invention is to provide a protective circuit that can realize high safety by reliably cutting off a charging and discharging circuit of a secondary battery.

Solution to Problem

In order to achieve the above object, the present invention provides the following means.
(1) A protective circuit including:
  a protective element that has a first terminal, a second terminal, a first fusible conductor of which both ends are connected to the first terminal and the second terminal, a third terminal, a fourth terminal, and a heat generator installed on a first energizing path between the third terminal and the fourth terminal;
  a plurality of secondary battery cells connected in series;
  an external positive electrode terminal and an external negative electrode terminal;
  an auxiliary power supply provided electrically independently of the plurality of secondary battery cells;
  a control device that monitors voltages of the plurality of secondary battery cells, detects an abnormality, and outputs a signal; and
  a switch that receives the signal from the control device and switches energization,
  wherein the control device is connected to the plurality of secondary battery cells,
  wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal, wherein the third terminal and the fourth terminal of the protective element are connected with the auxiliary power supply and the switch in series and in a loop, and wherein the switch is switched to energization by the signal from the control device, the heat generator of the protective element generates heat, and the first fusible conductor is fused to cut off a portion between the plurality of secondary battery cells and the external positive electrode terminal or a portion between the plurality of secondary battery cells and the external negative electrode terminal from each other.

[2] The protective circuit according to [1], further including: a second fusible conductor between the heat generator and the third terminal of the protective element or between the heat generator and the fourth terminal of the protective element.

[3] The protective circuit according to [1], further including: a second fusible conductor between the heat generator and the third terminal of the protective element, and a third fusible conductor between the heat generator and the fourth terminal.

[4] A protective circuit including:
  a protective element that has a first terminal, a second terminal, a first fusible conductor of which both ends are connected to the first terminal and the second terminal, a third terminal, a fourth terminal, and a heat generator installed on a first energizing path between the third terminal and the fourth terminal;
  a plurality of secondary battery cells connected in series;
  an external positive electrode terminal and an external negative electrode terminal;
  an auxiliary power supply;
  a control device that monitors voltages of the plurality of secondary battery cells, detects an abnormality, and outputs a signal; and
  a switch that receives the signal from the control device and switches energization,
  wherein the control device is connected to the plurality of secondary battery cells,
  wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal,
  wherein the third terminal and the fourth terminal of the protective element are connected with the auxiliary power supply and the switch in series and in a loop,
  wherein the second energizing path on which the first terminal and the second terminal of the protective element are connected to each other and a third energizing path which is connected from the third terminal to the fourth terminal via the auxiliary power supply and the switch are connected to each other, and
  wherein the switch is switched to energization by the signal from the control device, the heat generator of the protective element generates heat, and the first fusible conductor is fused to cut off a portion between the plurality of secondary battery cells and the external positive electrode terminal or a portion between the plurality of secondary battery cells and the external negative electrode terminal from each other.

[5] The protective circuit according to [4], further including: a second fusible conductor between the heat generator and the third terminal of the protective element or between the heat generator and the fourth terminal of the protective element.

[6] The protective circuit according to [4], further including: a second fusible conductor between the heat generator and the third terminal of the protective element, and a third fusible conductor between the heat generator and the fourth terminal.

[7] A protective circuit including:
  a protective element that has a first terminal, a second terminal, a first fusible conductor of which both ends are connected to the first terminal and the second terminal, a third terminal, and a heat generator installed on a first energizing path between the third terminal and the first terminal or between the third terminal and the second terminal;
  a plurality of secondary battery cells connected in series;
  an external positive electrode terminal and an external negative electrode terminal;
  an auxiliary power supply;
  a control device that monitors voltages of the plurality of secondary battery cells, detects an abnormality, and outputs a signal; and
  a switch that receives the signal from the control device and switches energization,
  wherein the control device is connected to the plurality of secondary battery cells,
  wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal,
  wherein the third terminal of the protective element is connected to the second energizing path, on which the first terminal and the second terminal of the protective element are connected to each other, via the auxiliary power supply and the switch, and
  wherein the switch is switched to energization by the signal from the control device, the heat generator of the protective element generates heat, and the first fusible conductor is fused to cut off a portion between the plurality of secondary battery cells and the external positive electrode terminal from each other or a portion between the plurality of secondary battery cells and the external negative electrode terminal from each other.

[8] The protective circuit according to [7], further including: a second fusible conductor between the heat generator and the third terminal of the protective element.

[9] The protective circuit according to [7], further including: a second fusible conductor between the heat generator and the third terminal of the protective element, and a third fusible conductor between the heat generator and the first terminal or between the heat generator and the second terminal.

[10] The protective circuit according to any one of [4] to [9], wherein a pole of the second energizing path on which the first terminal and the second terminal of the protective element are connected to each other and a pole of the auxiliary power supply opposite to a pole on a side connected to the third terminal are connected to each other with the same polarity.

[11] The protective circuit according to any one of [4] to [10], wherein the first fusible conductor is a laminate including a low melting point metal layer and a high melting point metal layer.

[12] The protective circuit according to [11], wherein the low melting point metal layer is made of Sn or an alloy containing Sn as a main component, and the high melting point metal layer is made of Ag, Cu, or an alloy containing Ag or Cu as a main component.

Advantageous Effects of Invention

According to the present invention, it is possible to realize high safety by reliably cutting off a charging and discharging circuit of a secondary battery.

DESCRIPTION OF EMBODIMENTS

Figure 1:
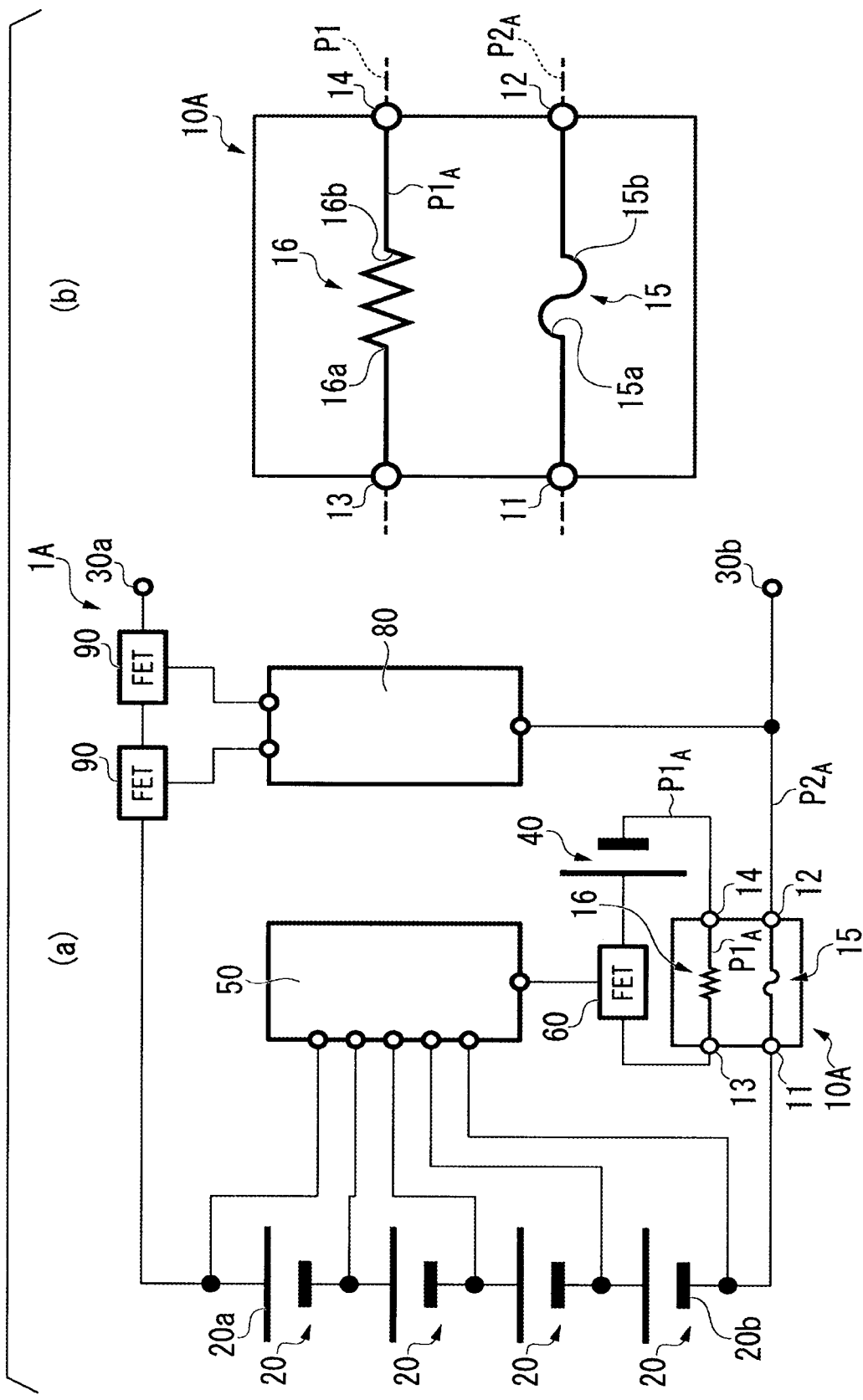
FIG. 1(a) is a circuit diagram schematically showing an example of a configuration of a protective circuit according to a first embodiment of the present invention.
FIG. 1(b) is a diagram schematically showing an example of a configuration of a protective element.

Hereinafter, embodiments of the present invention will be described in detail with reference to the drawings. In the drawings used in the following description, characteristic portions may be enlarged for convenience to make it easier to understand the characteristics, and the dimensional ratios of each component may differ from the actual ones. Materials, dimensions, and the like exemplified in the following description are examples, but the present invention is not limited to them and can be implemented with appropriate modifications within a scope in which the effects of the present invention are still exhibited.

FIG. 1(a) is a circuit diagram schematically showing an example of a configuration of a protective circuit according to a first embodiment of the present invention.

As shown in FIG. 1(a), the protective circuit 1A includes a protective element 10A, a plurality of secondary battery cells 20, 20, . . . , an external positive electrode terminal 30a, an external negative electrode terminal 30b, an auxiliary power supply 40, a first control device 50 (a control device), and a switch 60. The plurality of secondary battery cells 20, 20, . . . are connected in series, a positive electrode end 20a of the plurality of secondary battery cells 20, 20, . . . is connected to the external positive electrode terminal which will be described later, and a negative electrode end 20b thereof is connected to the external negative electrode terminal which will be described later. The plurality of secondary battery cells 20, 20, . . . are secondary batteries such as lithium ion secondary batteries. The total voltage of the plurality of secondary battery cells 20, 20, . . . is 100 V or more in the case of an application for a storage battery and is, for example, 350 V or more and 800 V or less in the case of an application for EV. The protective circuit 1A has the external positive external positive electrode terminal 30a and the external negative electrode terminal 30b and is connected to an external charging device via these external positive electrode terminal 30a and external negative electrode terminal 30b.

As shown in FIG. 1(b), the protective element 10A has a first terminal 11, a second terminal 12, a first fusible conductor 15 of which both ends are connected to the first terminal 11 and the second terminal 12, a third terminal 13, a fourth terminal 14, and a heat generator 16 installed on a first energizing path $P1_A$ between the third terminal 13 and the fourth terminal 14. In the present embodiment, the first terminal 11 and the second terminal 12 of the protective element 10A are installed on a second energizing path $P2_A$ between a negative electrode end 20b of the plurality of secondary battery cells 20, 20, . . . and the external negative electrode terminal 30b. Further, the third terminal 13 and the fourth terminal 14 of the protective element 10A are connected with the auxiliary power supply 40 and the switch 60 in series and in a loop.

The first fusible conductor 15 is made of, for example, a fuse element housed in a housing (not shown). The fuse element is, for example, in a flake shape or bar shape. One end 15a of the first fusible conductor 15 is connected to the first terminal 11, and the other end 15b thereof is connected to the second terminal 12.

The first fusible conductor 15 is preferably a laminate including a low melting point metal layer and a high melting point metal layer made of a high melting point metal having a higher melting point than the low melting point metal. In addition, the first fusible conductor 15 preferably has a coating structure constituted by a low melting point metal layer as an inner layer and a high melting point metal layer as an outer layer covering the low melting point metal layer as the inner layer. For example, the first fusible conductor 15 may be a laminate having a three layer structure in which an inner layer and outer layers with the inner layer sandwiched therebetween are laminated in a thickness direction, and the inner layer and the outer layers may be made of materials with different softening temperatures. In such a first fusible conductor 15, a mixed state of a solid phase and a liquid phase starts first in a layer of a material with a lower softening temperature among the inner layer and the outer layers of the laminate, and the layer of a material with a lower softening temperature can be cut off before a layer of a material with a higher softening temperature reaches the softening temperature.

The low melting point metal layer is made of, for example, Sn or an alloy containing Sn as a main component. Since the melting point of Sn is 232° C., a metal containing Sn as a main component has a low melting point and becomes soft at a low temperature. For example, a solidus line of a Sn/Ag 3%/Cu 0.5% alloy is 217° C. Further, various low melting point metals used as a fuse material in the related art can be used as the material forming the low melting point metal layer. Examples of the low melting point metal include a SnSb alloy, a BiSnPb alloy, a BiPbSn alloy, a BiPb alloy, a BiSn alloy, a SnPb alloy, a SnAg alloy, a SnAgCu alloy, a PbIn alloy, a ZnAl alloy, an InSn alloy, a PbAgSn alloy, and the like.

The material forming the high melting point metal layer is, for example, Ag, Cu, or an alloy containing Ag or Cu as a main component. Since Ag has a melting point of 962° C. and copper has a melting point of 1085° C., a layer made of a metal containing Ag or Cu as a main component maintains rigidity at a temperature at which a layer made of a low melting point metal softens.

The heat generator 16 is a plate-shaped member and has, for example, an insulating substrate and a heat generating portion formed on the insulating substrate. The heat generator 16 is disposed, for example, in contact with the first fusible conductor 15 or disposed directly above the first fusible conductor 15. In this case, the heat generator 16 preferably has a function of heating and softening the first fusible conductor 15 and a function of applying a pressing force of a pressing means, which will be described later, to the first fusible conductor 15 to cut off the first fusible conductor 15.

As the insulating substrate, a well-known substrate having insulating properties can be used, and examples of the insulating substrate include substrates made of alumina, glass ceramics, mullite, zirconia, and the like.

It is preferable that the heat generating portion be a resistor made of a conductive material that generates heat when energized. Examples of a material for the heat generating portion include materials containing metals such as nichrome, W, Mo, and Ru. For example, the heat generating portion is formed by applying a resistance paste made of a conductive material such as ruthenium oxide or carbon black and an inorganic binder such as water glass or an organic binder such as a thermosetting resin and baking the paste as necessary. Further, as the heat generating portion, a thin film of ruthenium oxide, carbon black, or the like may be formed through a process of printing, plating, vapor deposition, or sputtering. Alternatively, the heat generating portion may be formed by attaching or stacking these films.

Figure 2:
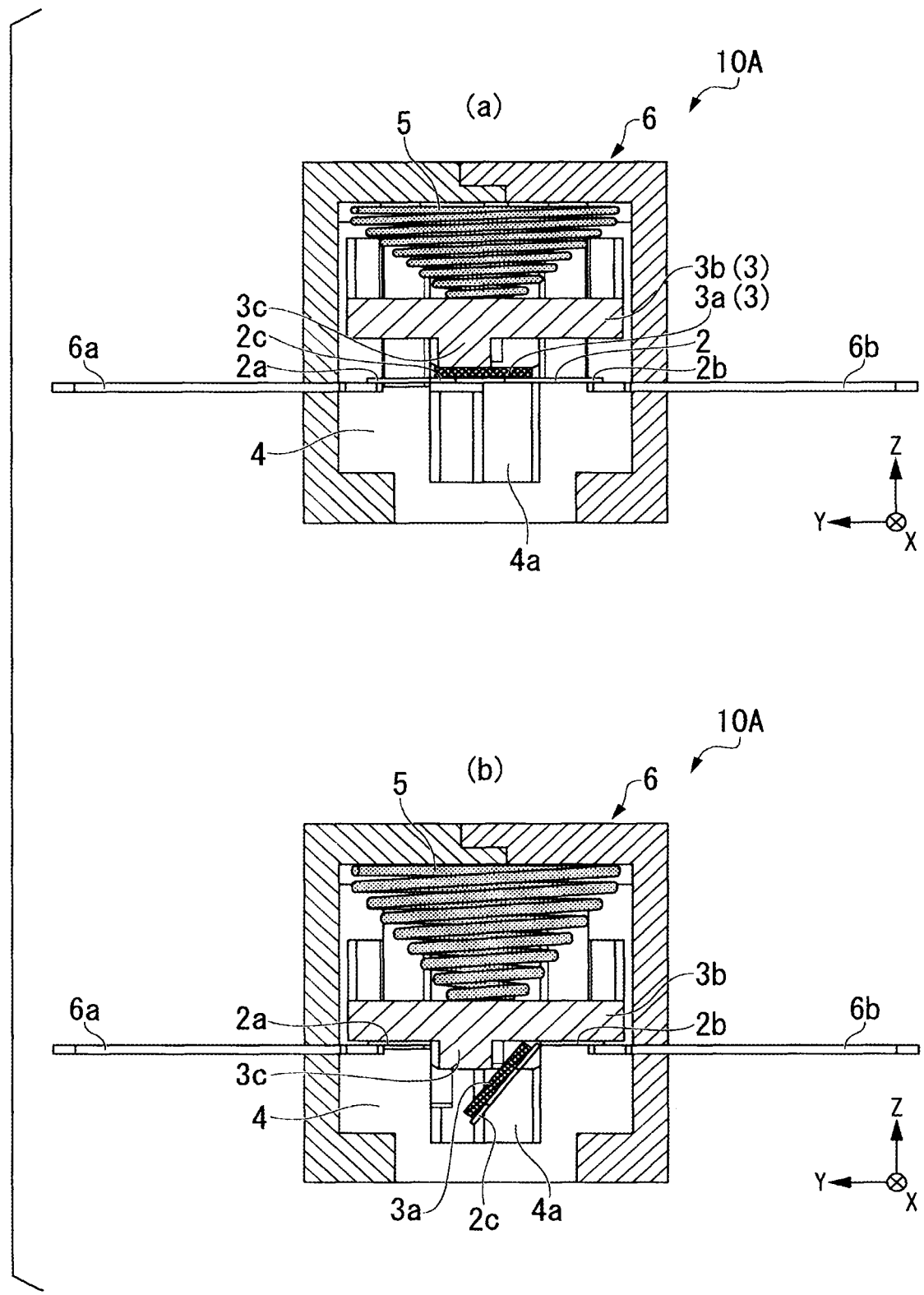
FIGS. 2(a) and 2(b) are cross-sectional views showing a structural example of the protective element of FIG. 1(b).

FIGS. 2(a) and 2(b) are cross-sectional views showing a structural example of the protective element 10A of FIG. 1(b). A structure of the protective element 10A in FIGS. 2(a) and 2(b) is an example, and a structure of the protective element of the present invention is not limited to this.

As shown in FIG. 2(a), the protective element 10A includes a fuse element (the first fusible conductor) 2 having a cut-off portion 2c between one end 2a and the other end 2b, a movable member 3a having a heat generator 3a and a convex member 3b, a concave member 4, a pressing means 5, and a case 6.

One end 2a of the fuse element 2 is connected to a first terminal 6a by soldering or the like, and the other end 2b thereof is connected to the second terminal 6b by soldering or the like. One end of the heat generator 3a is connected to a third terminal (not shown), and the other end thereof is connected to a fourth terminal (not shown). The convex member 3b has a function of applying a pressing force of the pressing means 5 to the cut-off portion 2c of the fuse element 2, and a convex portion 3c of the convex member 3b is in pressure contact with the heat generator 3a. The concave member 4 is disposed to face the movable member 3, and the cut-off portion 2a of the fuse element 2 is sandwiched between the concave member 4 and the movable member 3. A concave portion 4a of the concave member 4 is formed to accommodate the convex portion 3c of the heat generator 3a. The pressing means 5 applies force to the movable member 3 such that the cut-off portion 2c is sandwiched between the movable member 3 and the concave member 4 and a relative distance between them reduces when the cut-off portion 2a is cut off. A spring, for example, is used as the pressing means 5, and the pressing means 5 is accommodated between the convex member 3b and the case 6 in a state where a restoring force is held in a Z direction.

In the protective element 10A, when the heat generator 3a of the movable member 3 generates heat, the fuse element 2 softens at a temperature equal to or higher than a softening temperature of the fuse element 2, and along with this, the convex portion 3c of the convex member 3b enters the concave portion 4a of the concave member 4 due to the pressing force of the pressing means 5. As a result, the cut-off portion 2c is separated from the one end 2a (or the other end 2b), and the fuse element 2 is cut off (FIG. 2(b)).

The auxiliary power supply 40 is provided electrically independently of the plurality of secondary battery cells 20, 20, . . . . The auxiliary power supply 40 is not particularly limited as long as it can supply electric power capable of fusing the first fusible conductor 15 when energized and includes a well-known primary battery or secondary battery. Examples of the secondary battery include lead-acid batteries, lithium ion batteries, and the like. A voltage of the auxiliary power supply is, for example, 10V or more and 56V or less.

The first control device 50 is connected to the plurality of secondary battery cells 20, 20, . . . , monitors one or more voltages of the plurality of secondary battery cells 20, 20, . . . , detects an abnormality, and outputs a signal. The first control device 50 is, for example, an IC, detects an voltage of each of the plurality of secondary battery cells 20, 20, . . . connected to the second energizing path $P2_A$ of the protective element 10A, and determines whether or not an abnormality such as overcharging has occurred in the plurality of secondary battery cells 20, 20, . . . on the basis of the detected voltages. In a case where an abnormality has occurred in the plurality of secondary battery cells 20, 20, . . . , the first control device 50 cuts off the energizing path by operating the protective element 10A.

The switch 60 receives the signal from the first control device 50 and switches energization. The switch 60 is not particularly limited and is, for example, a field effect transistor (hereinafter also referred to as an FET). The FET is not particularly limited, and for example, a junction FET or a MOS FET can be used as the FET. In the present embodiment, a gate of the FET is connected to the first control device 50, and a drain of the FET is connected to the heat generator 16. The switch 60 is turned on or off by a control signal output from the first control device 50.

In the present embodiment, the protective circuit 1A further includes a second control device 80 and switches 90 and 90. The second control device 80 is, for example, an IC, monitors the overall voltage of the plurality of secondary battery cells 20, 20, . . . , detects an abnormality, and outputs a signal. The switches 90 and 90 receives the signal from the second control device 80 and switches energization. The switches 90 and 90 are not particularly limited and are, for example, an FET. The protective circuit 1A preferably includes the second control device 80 and the switches 90 and 90, but may not include these.

In the protective circuit 1A configured as described above, when the plurality of secondary battery cells 20, 20, . . . are charged, electric power is supplied to the plurality of secondary battery cells 20, 20, . . . from a charging device via an external circuit. Further, when the plurality of secondary battery cells 20, 20, . . . are discharged, electric power is supplied to the external circuit from the plurality of secondary battery cells 20, 20, . . . . A load such as a motor or a converter (not shown) is connected to the external circuit.

In this protective circuit 1A, the switch 60 is switched to energization by a signal from the first control device 50, the heat generator 16 of the protective element 10 generates heat, and the first fusible conductor 15 is fused to cut off a portion between the plurality of secondary battery cells 20, 20, . . . and the external negative electrode terminal 30b. Specifically, the first control device 50 detects the voltage of each of the plurality of secondary battery cells 20, 20, . . . and outputs a control signal to the switch 60 when it is determined that any one or a plurality of voltages of the plurality of secondary battery cells 20, 20, . . . deviate from a predetermined value, which indicates an over-discharge or over-charge state. When the switch 60 on the first energizing path $P1_A$ is turned on, electric power is supplied from the auxiliary power supply 40 to the heat generator 16, and the heat generator 16 generates heat. Due to the heat of the heat generator 16, the first fusible conductor 15 on the second energizing path $P2_A$ is fused, and thus the energizing path of the protective circuit 1A is cut off.

As described above, according to the present embodiment, the second energizing path $P2_A$ which goes through the first fusible conductor 15 and to which the plurality of secondary battery cells 20, 20, . . . are connected and the first energization path $P1_A$ on which the heat generator 16 and the auxiliary power supply 40 are connected to each other are formed independently of each other, and thus it is possible to appropriately select the specification of the heat generator 16 on the first energizing path $P1_A$. Therefore, even in a case where a large voltage and a large current are generated on the second energizing path $P2_A$, it is possible to ensure a sufficient withstand voltage by lowering the voltage applied to the heat generator 16 on the first energizing path $P1_A$. As a result, it is possible to realize high safety by reliably cutting off a charging and discharging circuit of the plurality of secondary battery cells 20, 20, . . . . In particular, even in a case where an unexpected accident or natural disaster occurs during use of a vehicle such as an electric vehicle, it is possible to prevent electric shock due to the charging and discharging circuit of the plurality of secondary battery cells 20, 20, . . . .

Further, the first terminal 11 and the second terminal 12 of the protective element 10A are installed on the second energizing path $P2_A$ between the negative electrode end 20b of the plurality of secondary battery cells 20, 20, . . . and the external negative electrode terminal 30b, and the third terminal 13 and the fourth terminal 14 of the protective element 10A are connected with the auxiliary power supply 40 and the switch 60 in series and in a loop, and thus it is possible to reliably apply only the voltage of the auxiliary power supply 40 to the heat generator 16. Therefore, it is possible to make a highly safe protective circuit in a charging and discharging circuit for motive power such as an electric vehicle equipped with a large-capacity lithium ion battery of several hundred volts (for example, 350 V or more).

Figure 3:
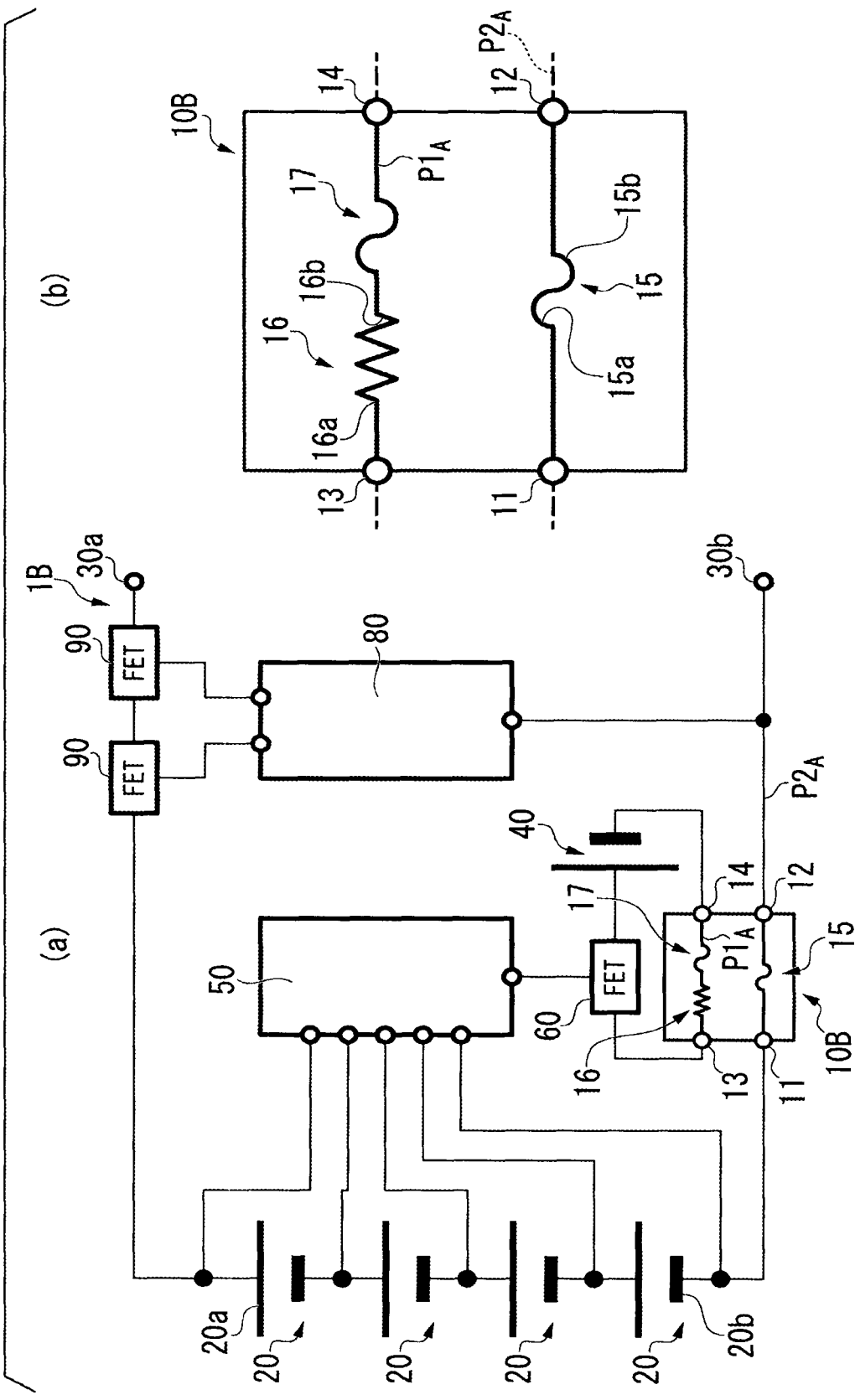
FIGS. 3(a) and 3(b) are diagrams showing a modification example of the protective circuit of FIG. 1(a) and the protective element of FIG. 1(b).

FIG. 3(a) is a circuit diagram showing a modification example of the protective circuit 1A of FIG. 1(a). A protective circuit 1B of FIG. 3(a) differs from the protective circuit 1A of FIG. 1(a) in that it has a protective element 10B instead of the protective element 10A. The rest of the configuration of the protective circuit 1B in FIG. 3(a) is basically the same as the configuration of the protective circuit 1A in FIG. 1(a), the same constituent elements are designated by the same reference signs, description of the same constituent elements will be omitted, and different parts will be mainly described below.

The protective circuit 1B includes the protective element 10B, a plurality of secondary battery cells 20, 20, . . . , an external positive electrode terminal 30a and an external negative electrode terminal 30b, an auxiliary power supply 40, a first control device 50, and a switch 60. As shown in FIG. 3(b), the protective element 10B has a second fusible conductor 17 between a heat generator 16 and a fourth terminal 14 of the protective element 10B. The second fusible conductor 17 may be configured to be fused by the heat generated by the heat generator 16 in the same manner as a first fusible conductor 15, or may be configured to be fused by self-heating (Joule heat) with a current flowing through a first energizing path $P1_A$. Further, in the present modification example, the protective element 10B has the second fusible conductor 17 between the heat generator 16 and the fourth terminal 14 of the protective element 10B, but the present invention is not limited to this, and the protective element 10B may have the second fusible conductor 17 between the heat generator 16 and the third terminal 13 of the protective element 10B. By providing the second fusible conductor 17 on the first energizing path $P1_A$ of the protective element 10B in this way, it is possible to cut off the first energizing path $P1_A$ in addition to the cut-off of a second energizing path $P2_A$, and it is possible to make a more highly safe protective circuit.

Figure 4:
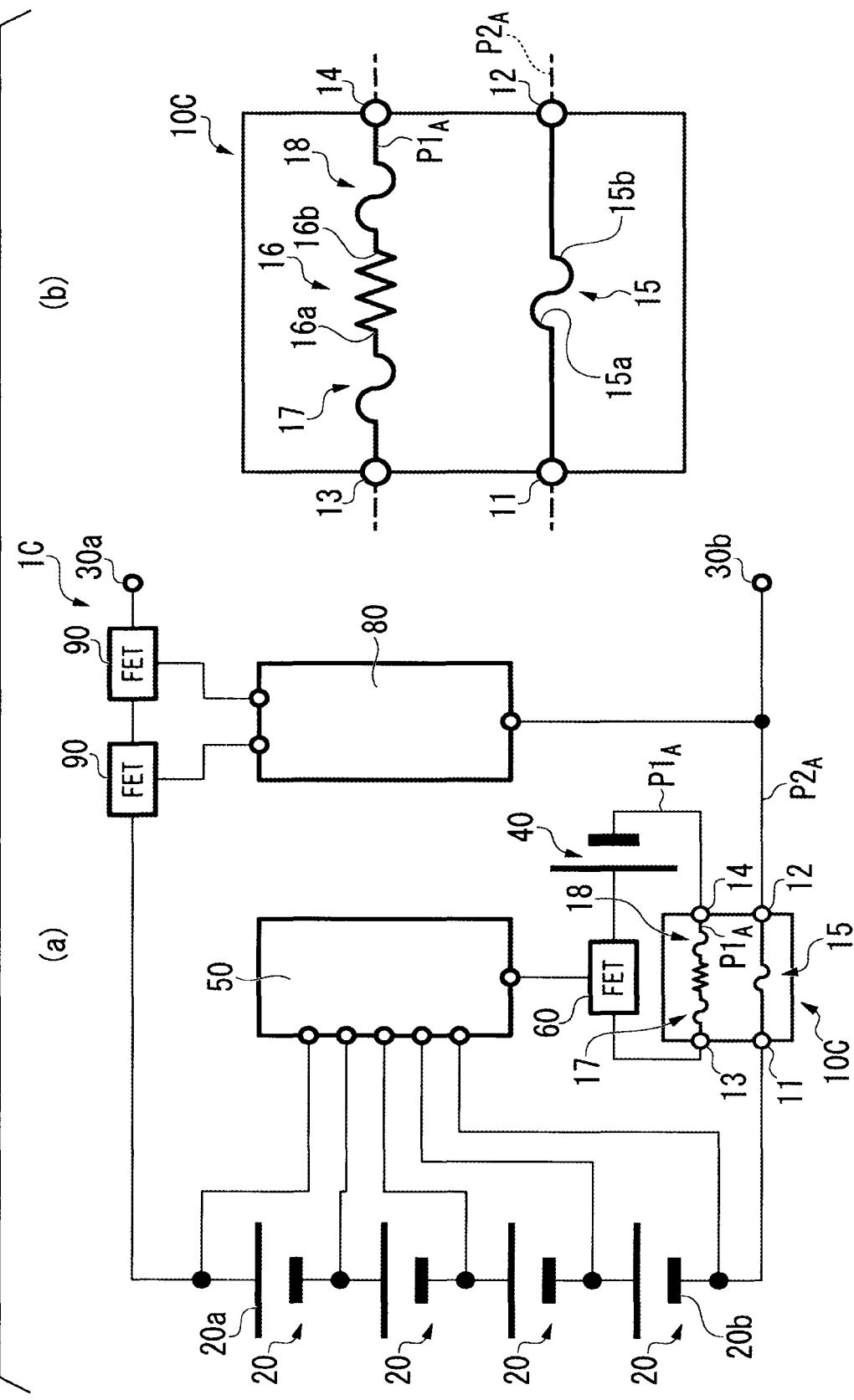
FIGS. 4(a) and 4(b) are diagrams showing another modification example of the protective circuit of FIG. 1(a) and the protective element of FIG. 1(b).

FIG. 4(a) is a circuit diagram showing another modification example of the protective circuit 1A of FIG. 1(a). A protective circuit 1C of FIG. 4(a) differs from the protective circuit 1A of FIG. 1 in that it has a protective element 10C instead of the protective element 10A. The rest of the configuration of the protective circuit 1C in FIG. 4(a) is basically the same as the configuration of the protective circuit 1A in FIG. 1(a), the same constituent elements are designated by the same reference signs, description of the same constituent elements will be omitted, and different parts will be mainly described below.

As shown in FIG. 4(a), the protective circuit 1C includes the protective element 10C, a plurality of secondary battery cells 20, 20, . . . , an external positive electrode terminal 30a and an external negative electrode terminal 30b, an auxiliary power supply 40, a first control device 50, and a switch 60. As shown in FIG. 4(b), the protective element 10C has a second fusible conductor 17 between a heat generator 16 and a third terminal 13 of the protective element 10B and a third fusible conductor 18 between the heat generator 16 and a fourth terminal 14 thereof. The second fusible conductor 17 may be configured to be fused by the heat generated by the heat generator 16 in the same manner as a first fusible conductor 15, or may be configured to be fused by self-heating (Joule heat) with a current flowing through a first energizing path $P1_A$. The third fusible conductor 18 may be configured to be fused by the heat generated by the heat generator 16 in the same manner as the first fusible conductor 15, or may be configured to be fused by self-heating (Joule heat) with a current flowing through the energizing path $P1_A$. Further, it is also possible to cut off the second fusible conductor 17 and the third fusible conductor 18 by applying a pressing force of a pressing means (not shown) to the heat generator 16. By providing the second fusible conductor 17 and the third fusible conductor 18 on the energizing path $P1_A$ of the protective element 10C in this way, it is possible to reliably cut off the first energizing path $P1_A$ in addition to the cut-off of a second energizing path $P2_A$, and it is possible to make a further highly safe protective circuit.

FIG. 5(a) is a circuit diagram schematically showing an example of a configuration of a protective circuit according to a second embodiment of the present invention, and FIG. 5(b) is a diagram schematically showing an example of a configuration of a protective element. A configuration of a protective circuit 1D shown in FIG. 5(a) differs from the configuration of the protective circuit 1A in that an auxiliary power supply 40 is electrically connected to a plurality of secondary battery cells 20, 20, . . . . The rest of the configuration of the protective circuit 1D in FIG. 5(a) is basically the same as the configuration of the protective circuit 1A in FIG. 1(a), the same constituent elements are designated by the same reference signs, description of the same constituent elements will be omitted, and different parts will be mainly described below.

As shown in FIG. 5(a), the protective circuit 1D includes a protective element 10A, a plurality of secondary battery cells 20, 20, . . . , an external positive electrode terminal 30a and an external negative electrode terminal 30b, an auxiliary power supply 40, a first control device 50, and a switch 60. A heat generator 16 of the protective element 10A is installed on a first energizing path $P1_B$ between a third terminal 13 and a fourth terminal 14.

In the present embodiment, a positive electrode end 40a of the auxiliary power supply 40 is connected to the switch 60, and a negative electrode end 40b thereof is connected to the external negative electrode terminal 30b. The negative electrode end 40b of the auxiliary power supply 40 is connected to a negative electrode end 20b of the plurality of secondary battery cells 20, 20, . . . via a first fusible conductor 15 of the protective element 10A. A second energizing path $P2_B$ on which a first terminal 11 and a second terminal 12 of the protective element 10A are connected to each other and a third energizing path $P3_B$ which is connected from the third terminal 13 to the fourth terminal 14 via the auxiliary power supply 40 and the switch 60 are connected to each other.

Also in this protective circuit 1D, as in the protective circuit 1A, the switch 60 is switched to energization by a signal from the first control device 50, the heat generator 16 of the protective element 10A generates heat, and the first fusible conductor 15 is fused to cut off a portion between the plurality of secondary battery cells 20, 20, . . . and the external negative electrode terminal 30b.

According to the present embodiment, even in a case where a large voltage and a large current are generated on the second energizing path $P2_B$, it is possible to ensure a sufficient withstand voltage by lowering the voltage applied to the heat generator 16 on the first energizing path $P1_B$. As a result, it is possible to realize high safety by reliably cutting off a charging and discharging circuit of the plurality of secondary battery cells 20, 20, . . . . Further, by setting the circuit layout of the protective element 10A to the GND side, it is possible to set the voltage between the heat generator 16 and the first fusible conductor 15 to only the voltage of the auxiliary power supply 40. For example, in a case where the protective circuit ID is applied to the charging and discharging circuit of an electric vehicle, when a battery (for example, 48 V) installed in the vehicle separately from the plurality of secondary battery cells 20, 20, . . . for motive power is used as the auxiliary power supply 40, it is possible to make a highly versatile protective circuit while improving safety, and in addition, it is possible to save a space for the protective circuit and to curb an increase in a weight of the vehicle.

Figure 5:
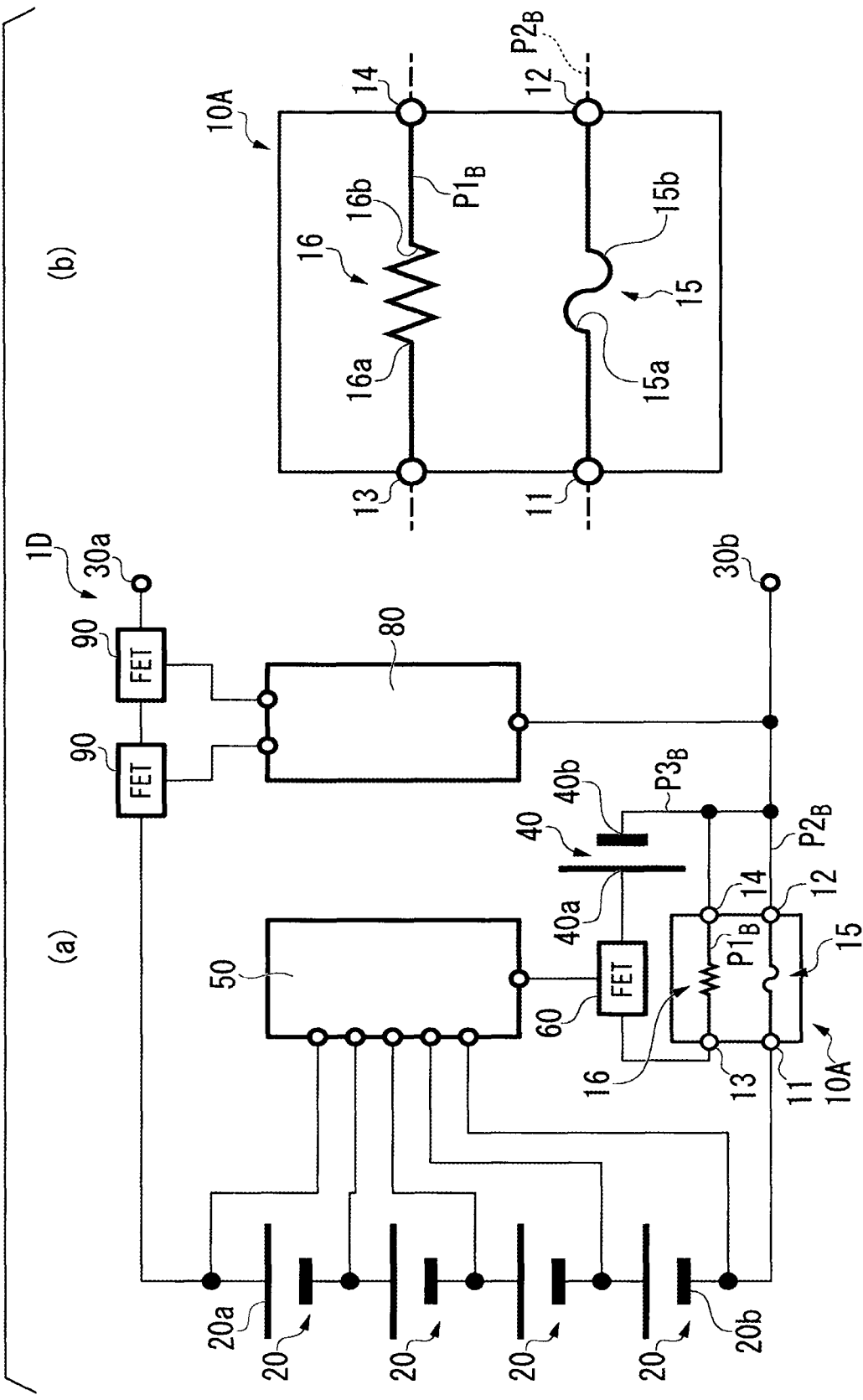
FIG. 5(a) is a circuit diagram schematically showing an example of a configuration of a protective circuit according to a second embodiment of the present invention.
FIG. 5(b) is a diagram schematically showing an example of a configuration of a protective element.
Figure 6:
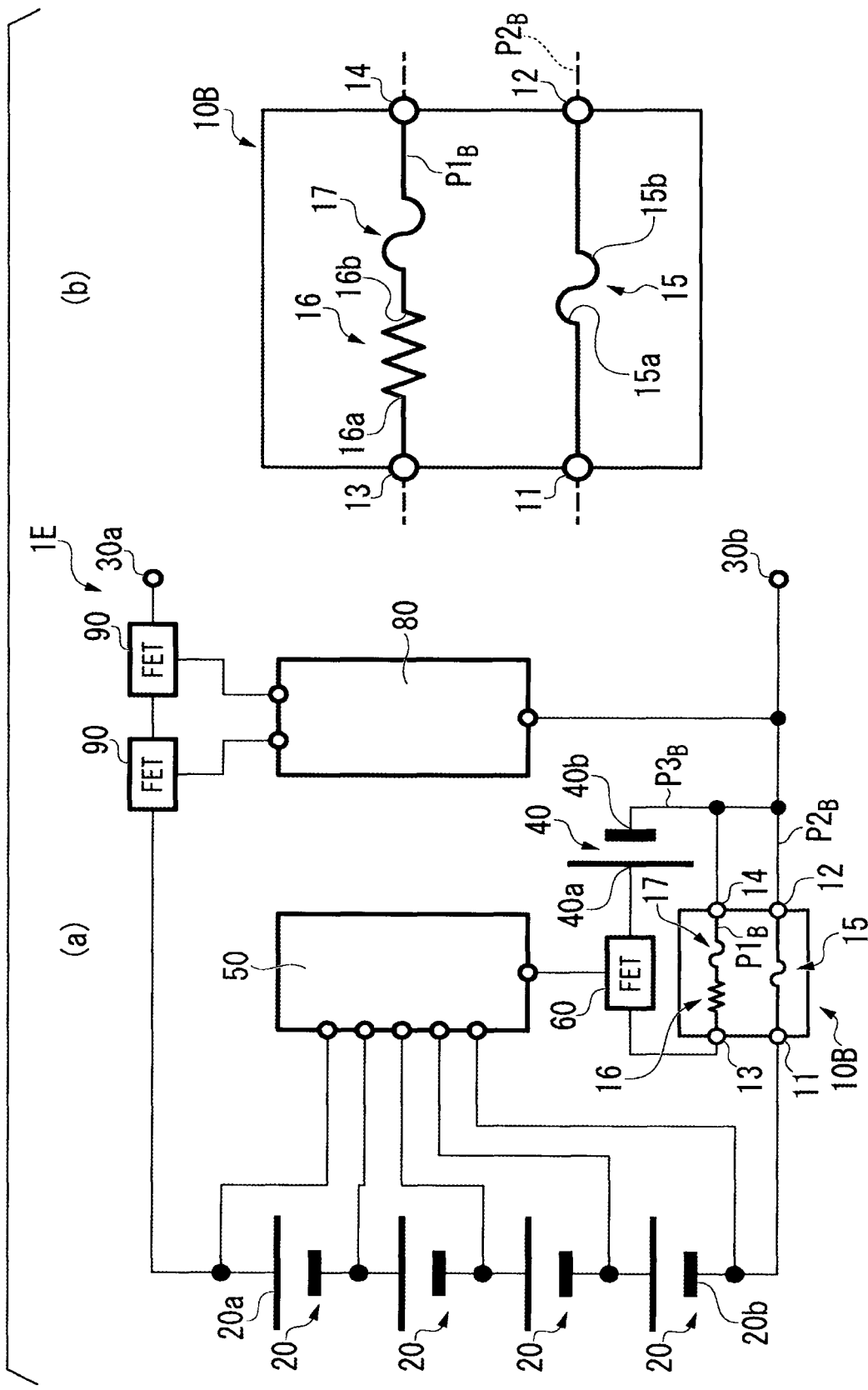
FIGS. 6(a) and 6(b) are diagrams showing a modification example of the protective circuit of FIG. 5(a) and the protective element of FIG. 5(b).

FIGS. 6(a) and 6(b) are diagrams showing a modification example of the protective circuit 1D of FIG. 5(a) and the protective element of FIG. 5(b). A protective circuit 1E of FIG. 6(a) differs from the protective circuit 1D of FIG. 5(a) in that it has a protective element 10B instead of the protective element 10A.

The protective circuit 1E includes the protective element 10B, a plurality of secondary battery cells 20, 20, . . . , an external positive electrode terminal 30a and an external negative electrode terminal 30b, an auxiliary power supply 40, a first control device 50, and a switch 60. As shown in FIG. 6(b), the protective element 10B has a second fusible conductor 17 between a heat generator 16 and a fourth terminal 14 of the protective element 10B. In the present modification example, the protective element 10B has the second fusible conductor 17 between the heat generator 16 and the fourth terminal 14 of the protective element 10B, but the present invention is not limited to this, and the protective element 10B may have the second fusible conductor 17 between the heat generator 16 and the third terminal 13 of the protective element 10B. By providing the second fusible conductor 17 on a first energizing path $P1_B$ of the protective element 10B in this way, it is possible to cut off the first energizing path $P1_B$ in addition to the cut-off of the second energizing path $P2_B$, and it is possible to make a more highly safe protective circuit.

Figure 7:
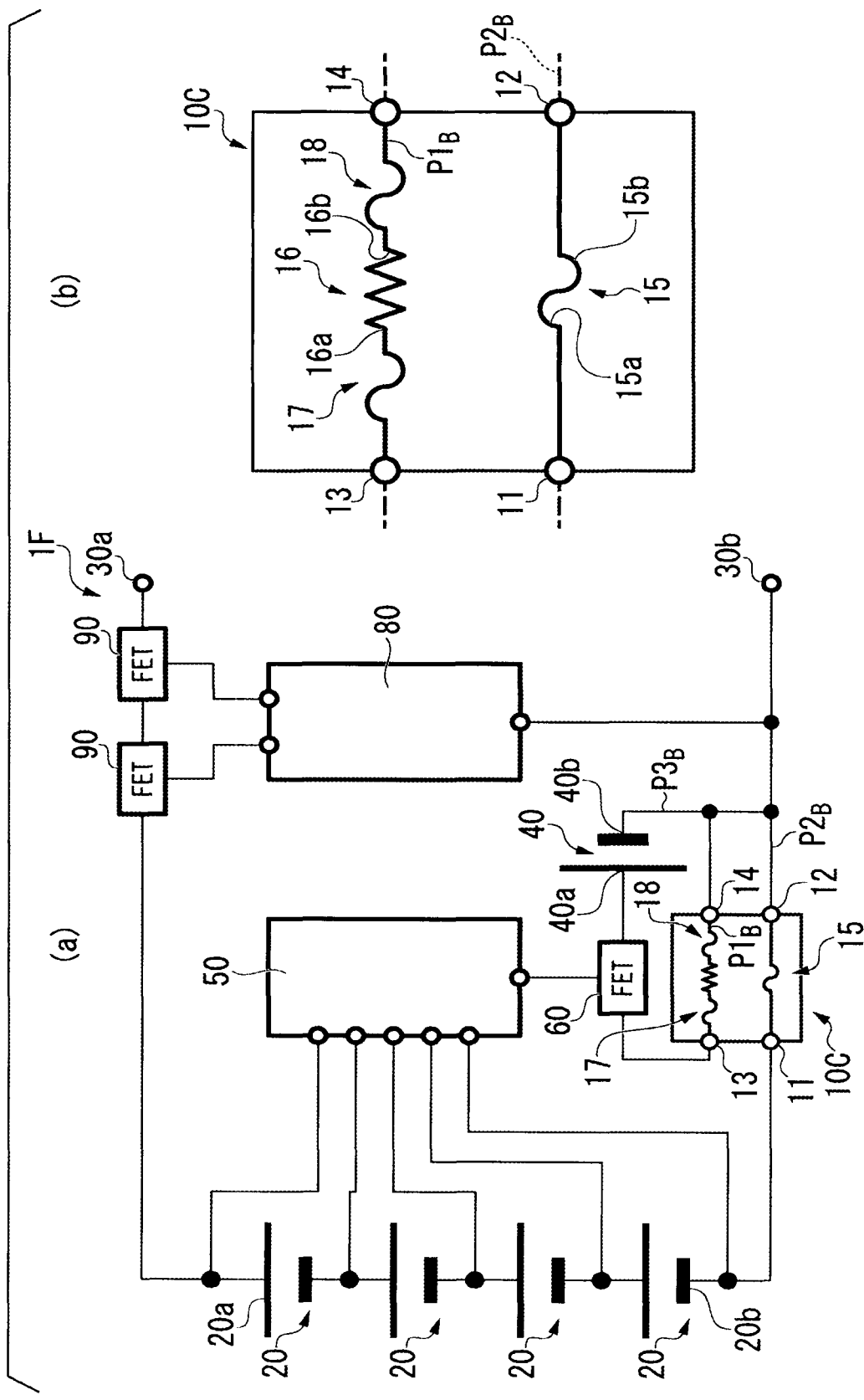
FIGS. 7(a) and 7(b) are diagrams showing another modification example of the protective circuit of FIG. 5(a) and the protective element of FIG. 5(b).

FIGS. 7(a) and 7(b) are diagrams showing another modification example of the protective circuit 1D of FIG. 5(a) and the protective element 10A of FIG. 5(b). A protective circuit 1F of FIG. 7(a) differs from the protective circuit 1D of FIG. 5 in that it has a protective element 10C instead of the protective element 10A.

As shown in FIG. 7(a), the protective circuit 1F includes the protective element 10C, a plurality of secondary battery cells 20, 20, . . . , an external positive electrode terminal 30a and an external negative electrode terminal 30b, an auxiliary power supply 40, a first control device 50, and a switch 60. As shown in FIG. 6(b), the protective element 10C has a second fusible conductor 17 between a heat generator 16 and a third terminal 13 of the protective element 10B and a third fusible conductor 18 between the heat generator 16 and a fourth terminal 14 thereof. By providing the second fusible conductor 17 and the third fusible conductor 18 on an energizing path $P1_B$ of the protective element 10C in this way, it is possible to reliably cut off the first energizing path $P1_B$ in addition to the cut-off of a second energizing path $P2_B$, and it is possible to make a further highly safe protective circuit.

Figure 8:
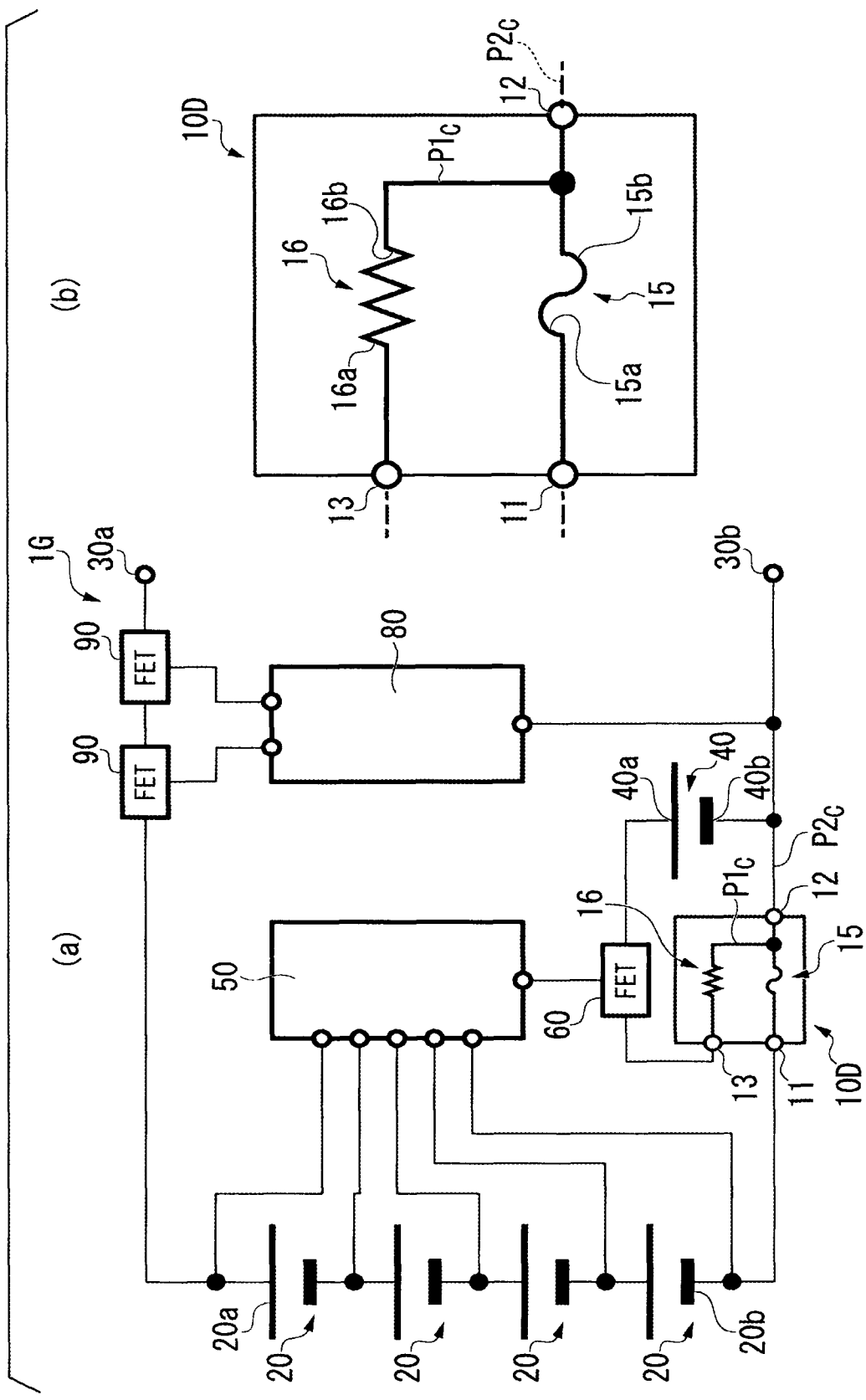
FIG. 8(a) is a circuit diagram schematically showing an example of a configuration of a protective circuit according to a third embodiment of the present invention.
FIG. 8(b) is a diagram schematically showing an example of a configuration of a protective element.

FIG. 8(a) is a circuit diagram schematically showing an example of a configuration of a protective circuit according to a third embodiment of the present invention, and FIG. 8(b) is a diagram schematically showing an example of a configuration of a protective element. A configuration of a protective circuit 1G shown in FIG. 8(a) differs from the configuration of the protective circuit 1D in that a third terminal 13 of a protective element 10D is connected to a second terminal 12 within the protective element 10D. The rest of the configuration of the protective circuit 1G in FIG. 8(a) is basically the same as the configuration of the protective circuit 1D in FIG. 5(a), the same constituent elements are designated by the same reference signs, description of the same constituent elements will be omitted, and different parts will be mainly described below.

As shown in FIG. 8(a), the protective circuit 1G includes the protective element 10D, a plurality of secondary battery cells 20, 20, ..., an external positive electrode terminal 30a and an external negative electrode terminal 30b, an auxiliary power supply 40, a first control device 50, and a switch 60. The protective element 10D has a first terminal 11, a second terminal 12, a first fusible conductor 15 of which both ends are connected to the first terminal 11 and the second terminal 12, a third terminal 13, and a heat generator 16 installed on a first energizing path $P1_C$ between the third terminal 13 and the second terminal 12. In the present embodiment, the heat generator 16 is installed on the first energization path P1c between the third terminal 13 and the second terminal 12, but the present invention is not limited to this, and the heat generator 16 may be installed on the first energizing path between the third terminal 13 and the first terminal 11.

In the present embodiment, a positive electrode end 40a of the auxiliary power supply 40 is connected to the switch 60, and a negative electrode end 40b thereof is connected to the external negative electrode terminal 30b. The negative electrode end 40b of the auxiliary power supply 40 is connected to a negative electrode end 20b of the plurality of secondary battery cells 20, 20, . . . via the first fusible conductor 15 of the protective element 10D. The third terminal 13 of the protective element 10D is connected to a second energizing path $P2_C$, on which the first terminal 11 and the second terminal 12 of the protective element 10D are connected to each other, via the auxiliary power supply 40 and the switch 60. In addition, a pole of the second energizing path $P2_C$ on which the first terminal 11 and the second terminal 12 of the protective element 10D are connected to each other and a pole of the auxiliary power supply 40 opposite to a pole on a side connected to the third terminal 13 may be connected to each other with the same polarity.

Also in this protective circuit 1G, as in the protective circuit 1D, the switch 60 is switched to energization by a signal from the first control device 50, the heat generator 16 of the protective element 10D generates heat, and the first fusible conductor 15 is fused to cut off a portion between the plurality of secondary battery cells 20, 20, . . . and the external negative electrode terminal 30b.

According to the present embodiment, even in a case where a large voltage and a large current are generated on the second energizing path $P2_C$, it is possible to ensure a sufficient withstand voltage by lowering the voltage applied to the heat generator 16 on the first energizing path $P1_C$. As a result, it is possible to realize high safety by reliably cutting off a charging and discharging circuit of the plurality of secondary battery cells 20, 20, . . . . Further, as in the protective circuit 1D of FIG. 5(a), by setting the circuit layout of the protective element 10D to the GND side, it is possible to set the voltage between the heat generator 16 and the first fusible conductor 15 to only the voltage of the auxiliary power supply 40. Therefore, it is possible to make a highly versatile protective circuit while improving safety, and in addition, it is possible to save a space for the protective circuit and to curb an increase in a weight of the vehicle. Furthermore, since the protective element 10D does not have a fourth terminal 14, the configuration of the protective element 10D can be simplified, and the configuration of the protective circuit 1G can be simplified and reduced in weight.

Figure 9:
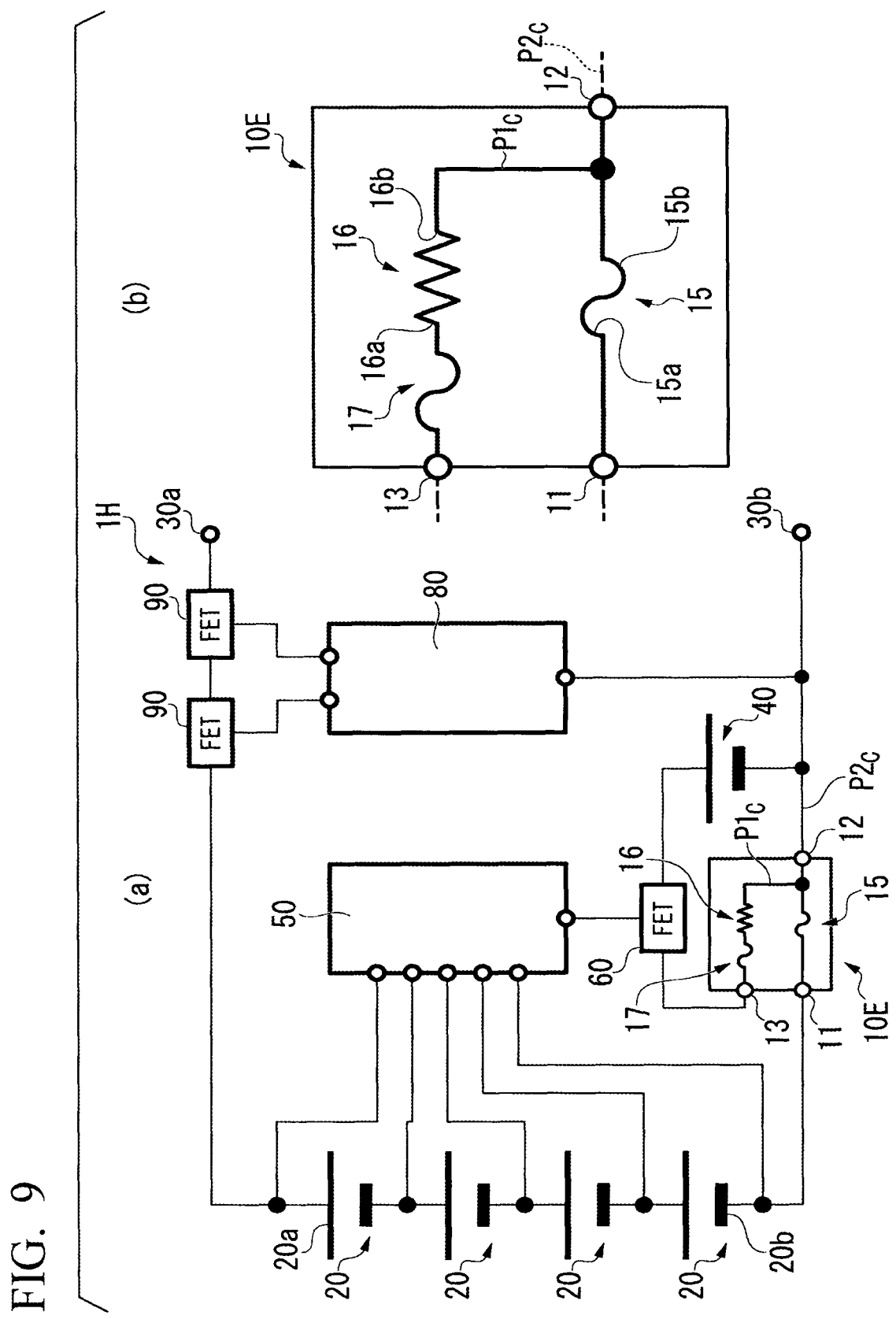
FIGS. 9(a) and 9(b) are diagrams showing a modification example of the protective circuit of FIG. 8(a) and the protective element of FIG. 8(b).

FIGS. 9(a) and 9(b) are diagrams showing a modification example of the protective circuit 1G of FIG. 8(a) and the protective element 10D of FIG. 8(b). A protective circuit 1H of FIG. 9(a) differs from the protective circuit 1G of FIG. 8(a) in that it has a protective element 10E instead of the protective element 10D.

The protective circuit 1H includes the protective element 10E, a plurality of secondary battery cells 20, 20, ..., an external positive electrode terminal 30a and an external negative electrode terminal 30b, an auxiliary power supply 40, a first control device 50, and a switch 60. As shown in FIG. 9(b), the protective element 10E has a second fusible conductor 17 between a heat generator 16 and a third terminal 13 of the protective element 10E. In the present modification example, the protective element 10E has the second fusible conductor 17 between the heat generator 16 and the third terminal 13 of the protective element 10B, but the present invention is not limited to this, and the protective element 10E may have the second fusible conductor 17 between the heat generator 16 and the second terminal 12 of the protective element 10E. By providing the second fusible conductor 17 on a first energizing path $P1_C$ of the protective element 10E in this way, it is possible to cut off the first energizing path $P1_C$ in addition to the cut-off of a second energizing path $P2_C$, and it is possible to make a more highly safe protective circuit.

Figure 10:
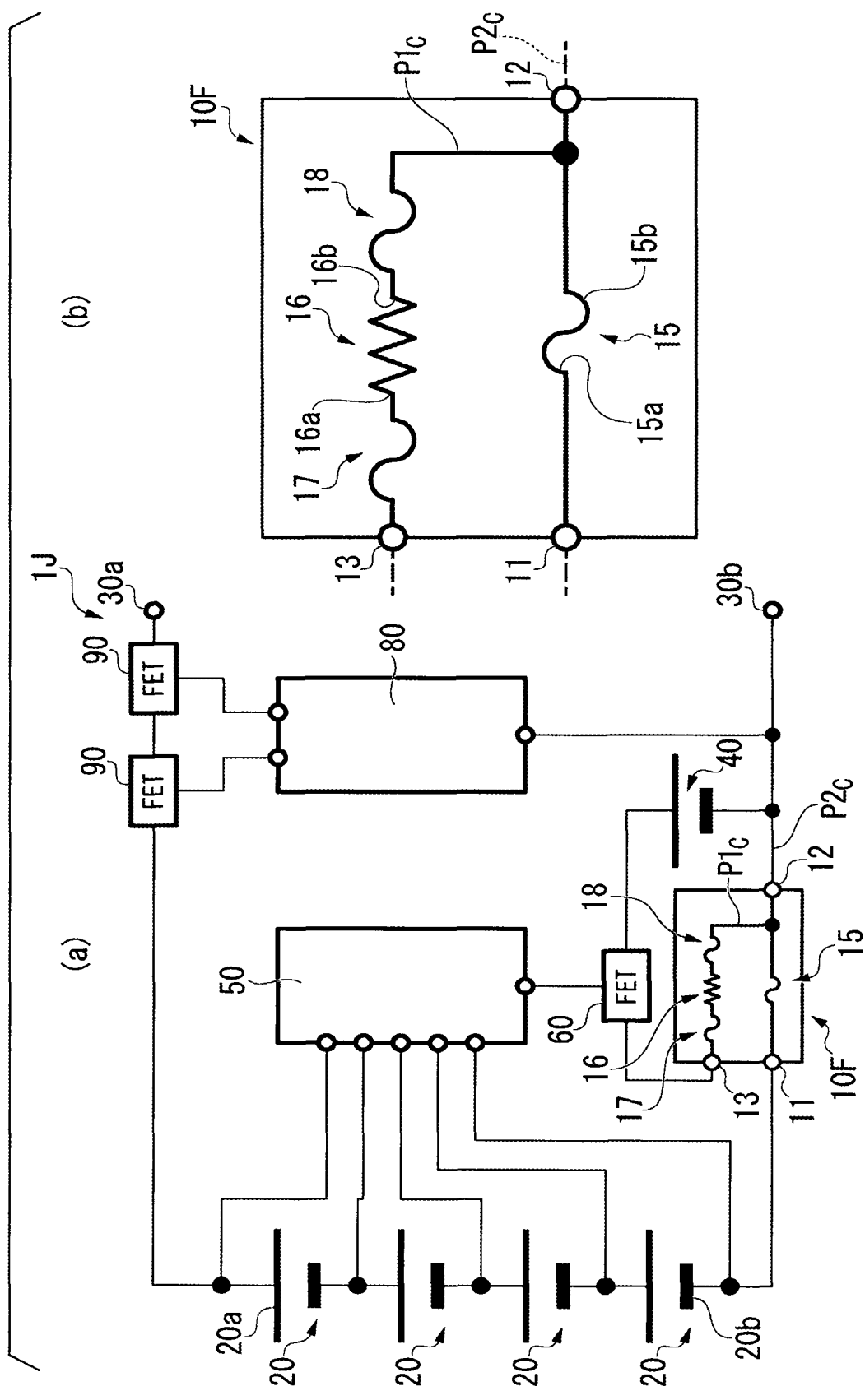
FIGS. 10(a) and 10(b) are diagrams showing another modification example of the protective circuit of FIG. 8(a) and the protective element of FIG. 8(b).

FIGS. 10(a) and 10(b) are diagrams showing another modification example of the protective circuit 1G of FIG. 8(a) and the protective element 10D of FIG. 8(b). A protective circuit 1J of FIG. 10(a) differs from the protective circuit 1G of FIG. 8(a) in that it has a protective element 10F instead of the protective element 10D.

As shown in FIG. 10(a), the protective circuit 1J includes the protective element 10F, a plurality of secondary battery cells 20, 20, ..., an external positive electrode terminal 30a and an external negative electrode terminal 30b, an auxiliary power supply 40, a first control device 50, and a switch 60. As shown in FIG. 10(b), the protective element 10F has a second fusible conductor 17 between a heat generator 16 and a third terminal 13 of the protective element 10F and a third fusible conductor 18 between the heat generator 16 and a second terminal 12 thereof. By providing the second fusible conductor 17 and the third fusible conductor 18 on an energizing path $P1_C$ of the protective element 10F in this way, it is possible to reliably cut off the first energizing path $P1_C$ in addition to the cut-off of a second energizing path $P2_C$, and it is possible to make a further highly safe protective circuit.

Figure 11:
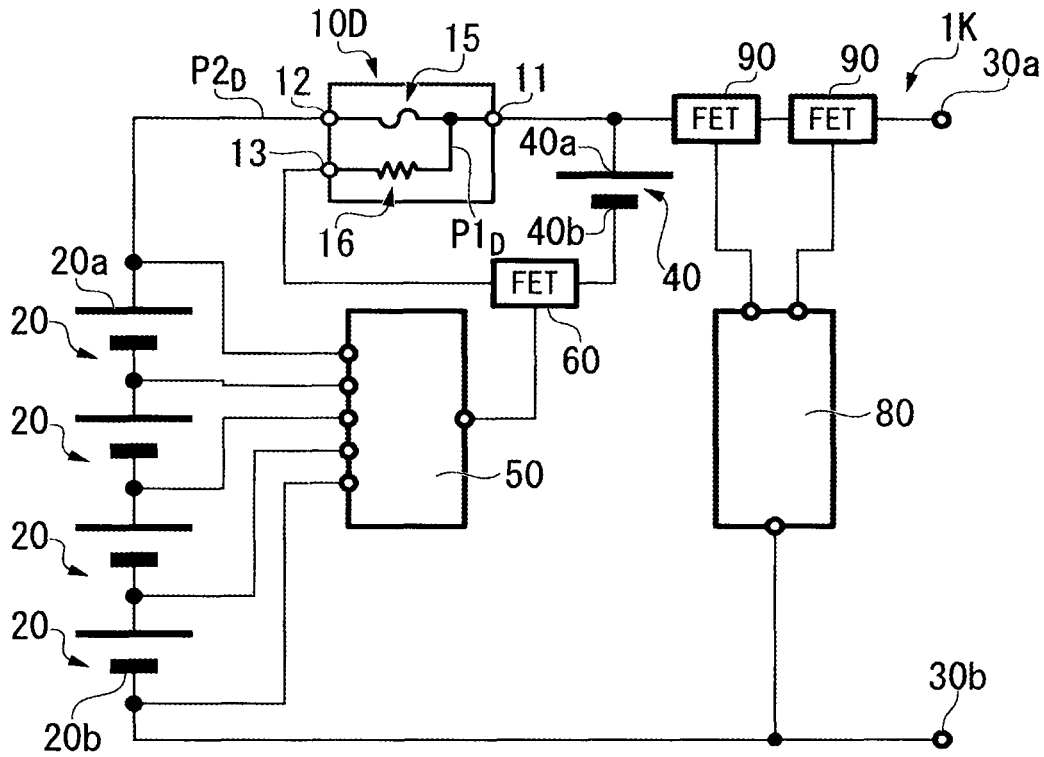
FIG. 11 is a circuit diagram schematically showing an example of a configuration of a protective circuit according to a fourth embodiment of the present invention.

FIG. 11 is a circuit diagram schematically showing an example of a configuration of a protective circuit according to a fourth embodiment of the present invention. A configuration of a protective circuit 1K shown in FIG. 11 differs from the configuration of the protective circuit 1D in that a protective element 10D is installed between an external positive electrode terminal 30a and a plurality of secondary battery cells 20, 20, . . . . The rest of the configuration of the protective circuit 1K in FIG. 11 is basically the same as the configuration of the protective circuit 1G in FIG. 8(a), the same constituent elements are designated by the same reference signs, description of the same constituent elements will be omitted, and different parts will be mainly described below.

As shown in FIG. 11, the protective circuit 1G includes the protective element 10D, a plurality of secondary battery cells 20, 20, . . . , an external positive electrode terminal 30a and an external negative electrode terminal 30b, an auxiliary power supply 40, a first control device 50, and a switch 60. The protective element 10D has a first terminal 11, a second terminal 12, a first fusible conductor 15 of which both ends are connected to the first terminal 11 and the second terminal 12, a third terminal 13, and a heat generator 16 installed on a first energizing path $P1_D$ between the third terminal 13 and the first terminal 11. In the present embodiment, the heat generator 16 is installed on the first energization path $P1_C$ between the third terminal 13 and the first terminal 11, but the present invention is not limited to this, and the heat generator 16 may be installed on the first energizing path between the third terminal 13 and the second terminal 12.

In the present embodiment, a positive electrode end 40a of the auxiliary power supply 40 is connected to the external positive electrode terminal 30a, and a negative electrode end 40b thereof is connected to the switch 60. Further, the positive electrode end 40a of the auxiliary power supply 40 is connected to a positive electrode end 20a of the plurality of secondary battery cells 20, 20, . . . via the first fusible conductor 15 of the protective element 10D. The third terminal 13 of the protective element 10D is connected to a second energizing path $P2_D$, on which the first terminal 11 and the second terminal 12 of the protective element 10D are connected to each other, via the auxiliary power supply 40 and the switch 60. In addition, a pole of the second energizing path $P2_D$ on which the first terminal 11 and the second terminal 12 of the protective element 10D are connected to each other and a pole of the auxiliary power supply 40 opposite to a pole on a side connected to the third terminal 13 may be connected to each other with the same polarity.

Also in this protective circuit 1K, as in the protective circuit 1G, the switch 60 is switched to energization by a signal from the first control device 50, the heat generator 16 of the protective element 10D generates heat, and the first fusible conductor 15 is fused to cut off a portion between the plurality of secondary battery cells 20, 20, . . . and the external positive electrode terminal 30a. Therefore, even in a case where a large voltage and a large current are generated on the second energizing path $P2_D$, it is possible to ensure a sufficient withstand voltage by lowering the voltage applied to the heat generator 16 on the first energizing path $P1_D$, and it is possible to realize high safety.

Figure 12:
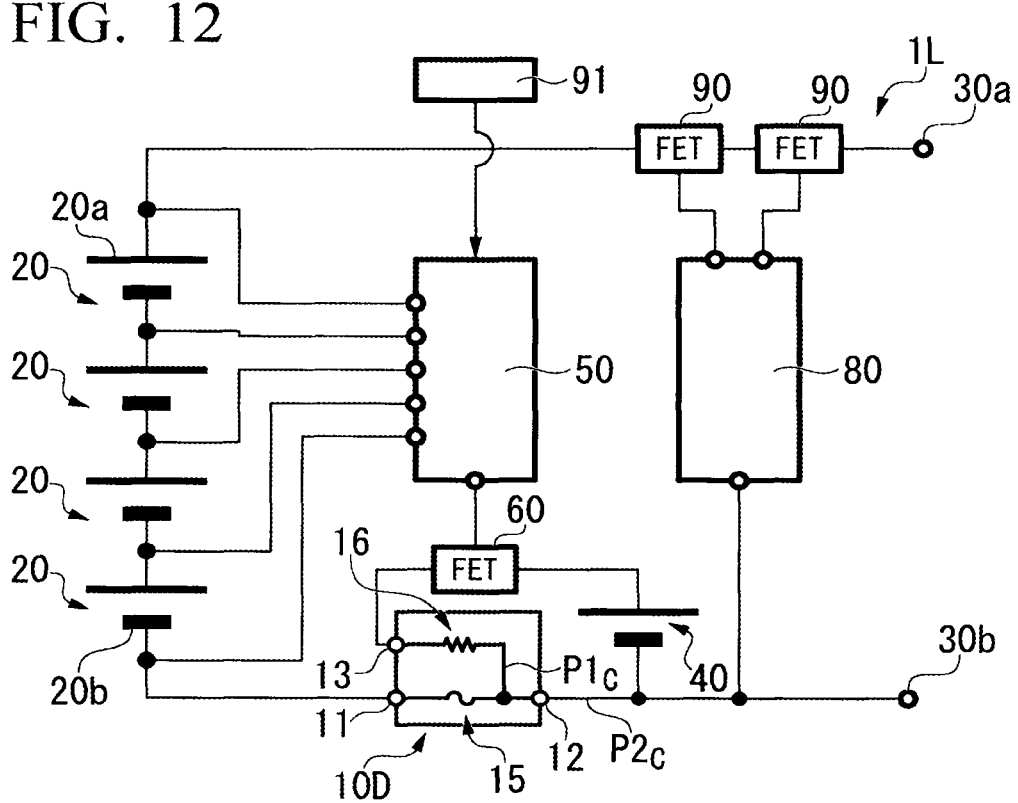
FIG. 12 is a diagram showing another modification example of the protective circuit of FIG. 8(a).
Figure 13:
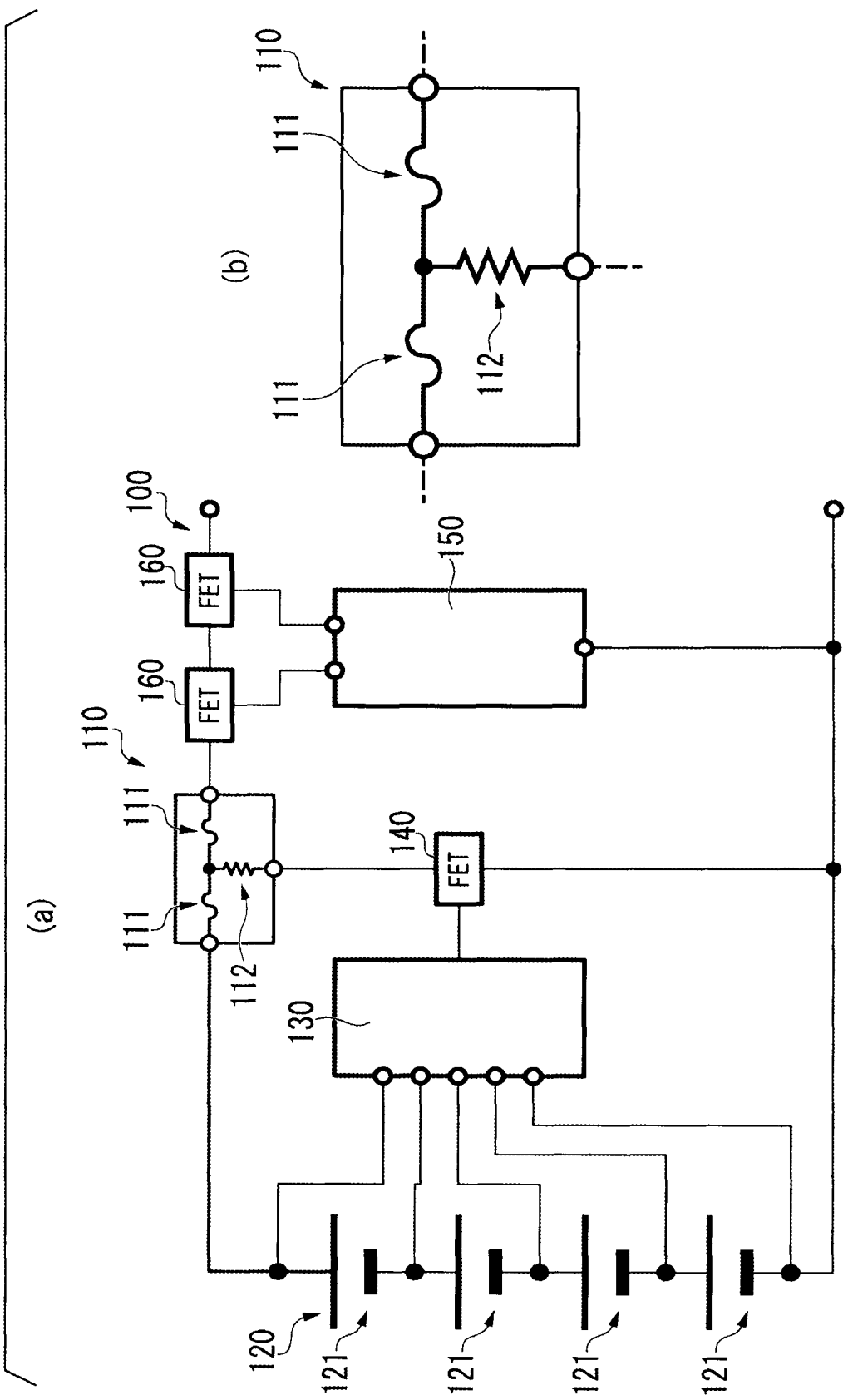
FIGS. 13(a) and 13(b) are diagrams showing configurations of a protective circuit of the related art and a protective element of the related art.

FIG. 12 is a diagram showing another modification example of the protective circuit 1G of FIG. 8(a). A configuration of a protective circuit 1L in FIG. 12 is basically the same as the configuration of the protective circuit 1G in FIG. 8(a), the same constituent elements are designated by the same reference signs, description of the same constituent elements will be omitted, and different parts will be mainly described below.

As shown in FIG. 12, the first control device 50 may receive a signal from a control device 91 such as an ECU installed in the vehicle and may output a signal to the switch 60 on the basis of the received signal. For example, the control device 91 outputs a signal to the switch 60 in a case where it detects one or both of an abnormality in the voltage of the plurality of secondary battery cells 20, 20, . . . and another abnormality occurring in the vehicle. According to the present modification example, not only the abnormality in the voltage of the plurality of secondary battery cells 20, . . . , but also the various abnormalities occurring in the vehicle are detected, and a portion between the plurality of the secondary battery cells 20, 20, . . . and the external negative electrode terminal 30b is cut off, and thus it is possible to realize higher safety by linking the protective circuit of the present invention with the control device 91 in the vehicle.

Although the embodiments of the present invention have been described in detail above, the present invention is not limited to the above embodiments, and various modifications and changes can be made within the scope of the gist of the present invention described in the scope of claims.

INDUSTRIAL APPLICABILITY

The protective circuit of the present invention can be applied to charging and discharging circuits for various secondary batteries such as lithium ion batteries. In particular, the protective circuit of the present invention is suitable for charging and discharging circuits of moving bodies such as vehicles such as electric vehicles (EV), ships, airplanes, or the like that use a secondary battery as a motive power source.

REFERENCE SIGNS LIST

1A Protective circuit
1B Protective circuit
1C Protective circuit
1D Protective circuit
1E Protective circuit
1F Protective circuit
1G Protective circuit
1H Protective circuit
1J Protective circuit
1K Protective circuit
1L Protective circuit
2 Fuse element
2a One end
2b The other end
2c Cut-off portion
3a Heat generator
3b Convex member
3c Convex portion
3 Movable member
4 Concave member
4a Concave portion
5 Pressing means
6 Case
6a First terminal
6b Second terminal
10 Protective element
10A Protective element
10B Protective element
10C Protective element
10D Protective element
10E Protective element
10F Protective element
11 First terminal
12 Second terminal
13 Third terminal
14 Fourth terminal
15 First fusible conductor
15a One end
15b The other end
16 Heat generator
17 Second fusible conductor 18 Third fusible conductor
20 Secondary battery cell
20a Positive electrode end
20b Negative electrode end
30a External positive electrode terminal
30b External negative electrode terminal
40 Auxiliary power supply
40a Positive electrode end
40b Negative electrode end
50 First control device
60 Switch
80 Second control device
90 Switch
91 Control device

The invention claimed is:

1. A protective circuit comprising:
a protective element that has a first terminal, a second terminal, a first fusible conductor of which both ends are connected to the first terminal and the second terminal, a third terminal, a fourth terminal, and a heat generator installed on a first energizing path between the third terminal and the fourth terminal;
a plurality of secondary battery cells connected in series;
an external positive electrode terminal and an external negative electrode terminal;
an auxiliary power supply provided electrically independently of the plurality of secondary battery cells;
a control device that detects vehicle abnormalities from a vehicle engine control apparatus while monitoring abnormal voltages of the plurality of secondary battery cells, and outputs a signal when the control device detects at least one of (1) one or more abnormal voltages of the plurality of secondary battery cells or (2) one or more vehicle abnormalities from the vehicle engine control apparatus; and
a switch that receives the signal from the control device and switches energization, wherein the control device outputs a signal to the switch when the vehicle engine control apparatus detects one or more vehicle abnormalities other than the one or more abnormal voltages of the plurality of secondary battery cells, wherein the control device is connected to the plurality of secondary battery cells and/or the vehicle engine control apparatus, wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal, wherein the third terminal and the fourth terminal of the protective element are connected with the auxiliary power supply and the switch in series and in a loop, and wherein the switch is switched to energization by the signal from the control device, the heat generator of the protective element generates heat, and the first fusible conductor is fused to cut off a portion between the plurality of secondary battery cells and the external positive electrode terminal or a portion between the plurality of secondary battery cells and the external negative electrode terminal from each other.

2. The protective circuit according to claim 1, further comprising: a second fusible conductor between the heat generator and the third terminal of the protective element or between the heat generator and the fourth terminal of the protective element.

3. The protective circuit according to claim 1, further comprising: a second fusible conductor between the heat generator and the third terminal of the protective element, and a third fusible conductor between the heat generator and the fourth terminal.

4. A protective circuit comprising:
a protective element that has a first terminal, a second terminal, a first fusible conductor of which both ends are connected to the first terminal and the second terminal, a third terminal, a fourth terminal, and a heat generator installed on a first energizing path between the third terminal and the fourth terminal;
a plurality of secondary battery cells connected in series;
an external positive electrode terminal and an external negative electrode terminal;
an auxiliary power supply;
a control device that detects vehicle abnormalities from a vehicle engine control apparatus while monitoring abnormal voltages of the plurality of secondary battery cells, and outputs a signal when the control device detects at least one of (1) one or more abnormal voltages of the plurality of secondary battery cells or (2) one or more vehicle abnormalities from the vehicle engine control apparatus; and
a switch that receives the signal from the control device and switches energization, wherein the control device outputs a signal to the switch when the vehicle engine control apparatus detects one or more vehicle abnormalities other than the one or more abnormal voltages of the plurality of secondary battery cells, wherein the control device is connected to the plurality of secondary battery cells and/or the vehicle engine control apparatus, wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal, wherein the third terminal and the fourth terminal of the protective element are connected with the auxiliary power supply and the switch in series and in a loop, wherein the second energizing path on which the first terminal and the second terminal of the protective element are connected to each other and a third energizing path which is connected from the third terminal to the fourth terminal via the auxiliary power supply and the switch are connected to each other, and wherein the switch is switched to energization by the signal from the control device, the heat generator of the protective element generates heat, and the first fusible conductor is fused to cut off a portion between the plurality of secondary battery cells and the external positive electrode terminal or a portion between the plurality of secondary battery cells and the external negative electrode terminal from each other.

5. The protective circuit according to claim 4, further comprising: a second fusible conductor between the heat generator and the third terminal of the protective element or between the heat generator and the fourth terminal of the protective element.

6. The protective circuit according to claim 4, further comprising: a second fusible conductor between the heat generator and the third terminal of the protective element, and a third fusible conductor between the heat generator and the fourth terminal.

7. A protective circuit comprising:
a protective element that has a first terminal, a second terminal, a first fusible conductor of which both ends are connected to the first terminal and the second terminal, a third terminal, and a heat generator installed on a first energizing path between the third terminal and the first terminal or between the third terminal and the second terminal;
a plurality of secondary battery cells connected in series;
an external positive electrode terminal and an external negative electrode terminal;
an auxiliary power supply;
a control device that detects vehicle abnormalities from a vehicle engine control apparatus while monitoring abnormal voltages of the plurality of secondary battery cells, and outputs a signal when the control device detects at least one of (1) one or more abnormal voltages of the plurality of secondary battery cells or (2) one or more vehicle abnormalities from the vehicle engine control apparatus; and
a switch that receives the signal from the control device and switches energization, wherein the control device outputs a signal to the switch when the vehicle engine control apparatus detects one or more vehicle abnormalities other than the one or more abnormal voltages of the plurality of secondary battery cells, wherein the control device is connected to the plurality of secondary battery cells and/or the vehicle engine control apparatus, wherein the first terminal and the second terminal of the protective element are installed on a second energizing path between a positive electrode end of the plurality of secondary battery cells and the external positive electrode terminal or between a negative electrode end of the plurality of secondary battery cells and the external negative electrode terminal, wherein the third terminal of the protective element is connected to the second energizing path, on which the first terminal and the second terminal of the protective element are connected to each other, via the auxiliary power supply and the switch, and wherein the switch is switched to energization by the signal from the control device, the heat generator of the protective element generates heat, and the first fusible conductor is fused to cut off a portion between the plurality of secondary battery cells and the external positive electrode terminal from each other or a portion between the plurality of secondary battery cells and the external negative electrode terminal from each other.

8. The protective circuit according to claim 7, further comprising: a second fusible conductor between the heat generator and the third terminal of the protective element.

9. The protective circuit according to claim 7, further comprising: a second fusible conductor between the heat generator and the third terminal of the protective element, and a third fusible conductor between the heat generator and the first terminal or between the heat generator and the second terminal.

10. The protective circuit according to claim 4, wherein a pole of the second energizing path on which the first terminal and the second terminal of the protective element are connected to each other and a pole of the auxiliary power supply opposite to a pole on a side connected to the third terminal are connected to each other with the same polarity.

11. The protective circuit according to claim 4, wherein the first fusible conductor is a laminate including a low melting point metal layer and a high melting point metal layer.

12. The protective circuit according to claim 11, wherein the low melting point metal layer is made of Sn or an alloy containing Sn as a main component, and the high melting point metal layer is made of Ag, Cu, or an alloy containing Ag or Cu as a main component.

* * * * *